(12) United States Patent
Essner (10) Patent No.: US 12,037,069 B2
(45) Date of Patent: Jul. 16, 2024

(54) DUAL CONTROL THROTTLE SYSTEM FOR RESCUE AND RECREATIONAL VEHICLES

(71) Applicant: Michael Essner, Wailuku, HI (US)

(72) Inventor: Michael Essner, Wailuku, HI (US)

( * ) Notice: Subject to any disclaimer, the term of this patent is extended or adjusted under 35 U.S.C. 154(b) by 104 days.

(21) Appl. No.: 17/836,126

(22) Filed: Jun. 9, 2022

(65) Prior Publication Data

US 2023/0159130 A1   May 25, 2023

Related U.S. Application Data

(60) Provisional application No. 63/281,892, filed on Nov. 22, 2021.

(51) Int. Cl.
*B62K 11/14* (2006.01)
*F02D 11/04* (2006.01)

(52) U.S. Cl.
CPC .............. *B62K 11/14* (2013.01); *F02D 11/04* (2013.01)

(58) Field of Classification Search
CPC ......... B62K 11/14; B62K 23/06; F02D 11/04; F02D 11/02; B62J 11/13
See application file for complete search history.

(56) References Cited

U.S. PATENT DOCUMENTS

| | | | | |
|---|---|---|---|---|
| 3,964,564 A * | 6/1976 | Pittarelli | ................ | G09B 9/058 434/61 |
| 4,619,341 A * | 10/1986 | Davis | ..................... | B62K 11/14 74/551.8 |
| 5,256,092 A * | 10/1993 | Jones | ...................... | B63B 34/10 440/87 |
| 8,695,744 B1 * | 4/2014 | Bedard | .................. | B62M 27/02 180/9.1 |
| 2004/0214639 A1 * | 10/2004 | Makuta | .................. | G09B 9/058 463/36 |
| 2009/0183587 A1 * | 7/2009 | Amce | .................... | B62K 23/06 74/489 |
| 2016/0046345 A1 * | 2/2016 | Oravecz | ................. | B62K 11/04 74/484 R |

FOREIGN PATENT DOCUMENTS

| | | | | |
|---|---|---|---|---|
| EP | 1455325 A2 * | 8/2004 | ............. | G09B 9/058 |
| WO | WO 2009065612 A2 * | 5/2009 | ............. | B62K 23/02 |

* cited by examiner

*Primary Examiner* — Vinh Luong
(74) *Attorney, Agent, or Firm* — Brennan, Manna & Diamond, LLC (57) ABSTRACT

The present invention relates to a dual control throttle system for actuating rescue, safety, recreational, and all-terrain vehicles. The throttle system has two individual throttle cables attached to a handlebar and are independently controlled by a corresponding throttle control. The cables are attached to a carburetor having slots/connectors for connecting the throttles cables. Each throttle cable system can be independently used for actuating a vehicle and enables users to actuate the opposite throttle should the first throttle and/or cable malfunction, ensuring the vehicle remains operational and therefore, prevents rescue situations from taking additional time due to malfunctioning rescue, safety, and recreational vehicles. The cables can be secured to a central plate and yoke for vehicles whose steering unit can rotate 360 degrees.

9 Claims, 5 Drawing Sheets

DUAL CONTROL THROTTLE SYSTEM FOR RESCUE AND RECREATIONAL VEHICLES

CROSS-REFERENCE TO RELATED APPLICATION

The present application claims priority to, and the benefit of, U.S. Provisional Application No. 63/281,892, which was filed on Nov. 22, 2021 and is incorporated herein by reference in its entirety.

FIELD OF THE INVENTION

The present invention relates generally to the field of rescue vehicles. More specifically, the present invention relates to a novel throttle system for accelerating rescue vehicles. The throttle system is a dual control throttle system that features two individual throttle cables for selectively and independently actuating and providing power to the vehicle. The system has a carburetor attached to both the cables and can have a yoke and plate for vehicles whose steering unit rotates 360 degrees. On breakdown of one of the cables, the other cable can be instantaneously used for actuating the vehicle. Accordingly, the present disclosure makes specific reference thereto. Nonetheless, it is to be appreciated that aspects of the present invention are also equally applicable to other like applications, devices, and methods of manufacture.

BACKGROUND

By way of background, an all-terrain vehicle (ATV) is a vehicle that travels on low-pressure tires, with a seat that is straddled by the operator, along with handlebars for steering control. ATVs are used by rescue operations teams for search and rescue operations in hard-to-reach areas and in difficult terrain. The ATVs are designed to traverse difficult terrain ranging from deserts to jungles and mountainous areas and therefore are important for rescue operations where other vehicles cannot gain access. The ATVs can be equipped with rescue equipment and can carry personnel. Generally, ATVs have a single throttle cable for opening the throttle of the engine of the ATV, enabling the driver to control the vehicle's level of acceleration. However, in many cases, the single throttle cable malfunctions or breaks down, thereby preventing the vehicle from reaching the target site or endangered person quickly. Availability of a single throttle cable increases the risk of vehicle malfunctioning and does not provide a back up for facilitating acceleration to the vehicle. People desire a throttle system for ATVs that can overcome problems of malfunctioning of a single throttle cable causing delay in a rescue operation.

Jet skis are used as personal watercraft by people but are also commonly used as motorized water rescue craft. Jet skis can reach a target site quickly and helps rescuing people easily and effectively. However, jet skis have a single throttle cable that increases risk of malfunctioning of the jet skis. Further, breakdown of throttle cable can lead to lapse and delay in rescue operation. People desire a dual throttle system for motorized water rescue crafts that can be used for selecting any of the two throttles.

Commonly, the single throttle cable systems are designed to accommodate right-handed drivers and therefore, the left-handed drivers face challenge in driving single throttle vehicles. People desire a throttle cable technology deployed in ATVs, jet skis and more that can be reliable and easily utilized by left-handed drivers.

Therefore, there exists a long felt need in the art for an improved throttle cable system for rescue vehicles like ATVs and jet skis. There is also a long felt need in the art for a dual throttle cable system that provides two independent throttles and cables for selectively actuating one of the throttle cable systems. Additionally, there is a long felt need in the art for two independent throttles and cables in rescue vehicles that enables activation of second throttle cable when a first throttle cable breaks down. Moreover, there is a long felt need in the art for improved throttle cable system that prevents rescue operations from taking additional time due to malfunctioning of single throttle system of rescue vehicles. Further, there is a long felt need in the art for throttle cable system that accommodates left-handed drivers. Furthermore, there is a long felt need in the art for an improved throttling system that can be easily implemented in ATVs, jet skis, and several other recreational vehicles. Finally, there is a long felt need in the art for a dual throttle cable system that facilitates acceleration of a rescue vehicle using single throttle and enabling activation of the opposite throttle cable upon break down of the actuated throttle cable.

The subject matter disclosed and claimed herein, in one embodiment thereof, comprises a dual throttle control system for rescue and recreational vehicles. The system is beneficial technology that gives more reliability and prevents rescue situations from taking additional time due to malfunctioning rescue and safety vehicles. The system further comprising a first throttle cable attached to a first thumb throttle control positioned on a handlebar of a vehicle, an independent and second throttle cable attached on a second thumb throttle control, an engine carburetor having a connector for each said first throttle cable and the second throttle cable wherein the throttle cables connect the respective thumb control and connector, the carburetor is configured to mix fuel and air on independent activation of either of the throttle cables using the corresponding throttle control.

In this manner, the novel dual throttle cable system of the present invention accomplishes all of the forgoing objectives and provides rescue vehicles like ATVs and jet skis with a dual throttle cable system for facilitating acceleration with a single throttle. The system has two independent throttle cables enabling a user to select a single throttle to actuate and power the vehicle and actuate opposite throttle upon break down of the initial actuated throttle. The system prevents rescue situations from taking additional time due to malfunctioning of throttle cables.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a dual throttle control system for vehicles. The system further comprising a first throttle cable attached to a first thumb throttle control positioned on a handlebar of a vehicle, an independent and second throttle cable attached on a second thumb throttle control, an engine carburetor having a connector for each said first throttle cable and the second throttle cable wherein the throttle cables connect the respective thumb control and connector, the carburetor is configured to mix fuel and air on independent activation of either of the throttle cables using the corresponding throttle control.

In yet another embodiment, the dual throttle control system is designed for vehicles whose steering unit does not move 360 degrees.

In yet another embodiment, the dual throttle control system is installed in an all-terrain vehicle.

In yet another embodiment, the dual throttle control system is installed in a personalized watercraft.

In yet another embodiment, the carburetor can be one of constant choke carburetor, constant vacuum carburetor, and multiple venturi carburetor.

In yet another embodiment, a rescue vehicle equipped with a dual control throttle system is disclosed. The vehicle includes a handlebar, a pair of throttle controls including a left throttle control and a right throttle control, the throttle controls are positioned on ends of the handlebar, a pair of throttle cables including a left throttle cable and a right throttle cable, the left throttle cable is attached to the left throttle control, the right throttle cable is attached to the right throttle control, a carburetor having a separate connector for independently connecting to said left throttle cable and said right throttle cable wherein the left throttle control facilitates the acceleration of the vehicle using the carburetor and the left throttle cable and the right throttle control independently facilitates the acceleration of the vehicle using the carburetor and the right throttle cable; wherein the vehicle is accelerated using only a single throttle cable.

In yet another embodiment, the throttle system enables selection of a single throttle using the throttle control to actuate and power the vehicle.

In yet another embodiment, the right throttle control facilitates acceleration using the right throttle cable of the vehicle when the left throttle cable breaks down or wears out.

In yet another embodiment, the left throttle control facilitates acceleration using the left throttle cable of the vehicle when the right throttle cable breaks down or wears out.

In yet another embodiment, the vehicle is an ATV, a jet ski, a snowmobile, or any other handlebar-controlled vehicle.

In yet another embodiment, an improved throttling system for ATVs, jet skis, and recreational vehicles is disclosed. The system includes a dual cabled throttle assembly featuring two individual throttle cables attached to corresponding throttle control bars, a carburetor independently connected to said throttle cables, wherein said throttle cables meet at a central plate and yoke, enabling a user to select a single throttle for actuating and powering the vehicle.

In yet another embodiment, a method for providing power to a vehicle on breakdown of a throttle cable is described. The method includes the steps of installing a dual control throttle system in the vehicle, the dual control throttle system includes two individual throttle cables attached to a carburetor; accelerating the vehicle by using a right throttle control positioned on a handlebar wherein the right throttle control is attached to one of the throttle cables; detecting break down of said one of the cables; and accelerating the vehicle by using a left throttle control positioned on the handlebar wherein the left throttle control is attached to the other throttle cable.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for an improved throttle cable system for rescue vehicles like ATVs and jet skis. There is also a long felt need in the art for a dual throttle cable system that provides two independent throttles and cables for selectively actuating one of the throttle cable systems. Additionally, there is a long felt need in the art for two independent throttles and cables in rescue vehicles that enables activation of second throttle cable when a first throttle cable breaks down. Moreover, there is a long felt need in the art for improved throttle cable system that prevents rescue operations from taking additional time due to malfunctioning of a single throttle system of rescue vehicles. Further, there is a long felt need in the art for throttle cable system that accommodates left-handed drivers. Furthermore, there is a long felt need in the art for an improved throttling system that can be easily implemented in ATVs, jet skis, snowmobiles, and other recreational vehicles. Finally, there is a long felt need in the art for dual throttle cable system that facilitates acceleration of a rescue vehicle using the single throttle and enabling activation of the opposite throttle cable upon break down of the actuated throttle cable.

The present invention, in one exemplary embodiment, is an improved throttling system for ATVs, jet skis, snowmobiles, and recreational vehicles. The system includes a dual cabled throttle assembly featuring two individual throttle cables attached to corresponding throttle control bars, a carburetor independently connected to said throttle cables, wherein said throttle cables meet at a central plate and yoke, enabling a user to select and actuate a single throttle for actuating and powering the vehicle.

Figures 1A, 1B:
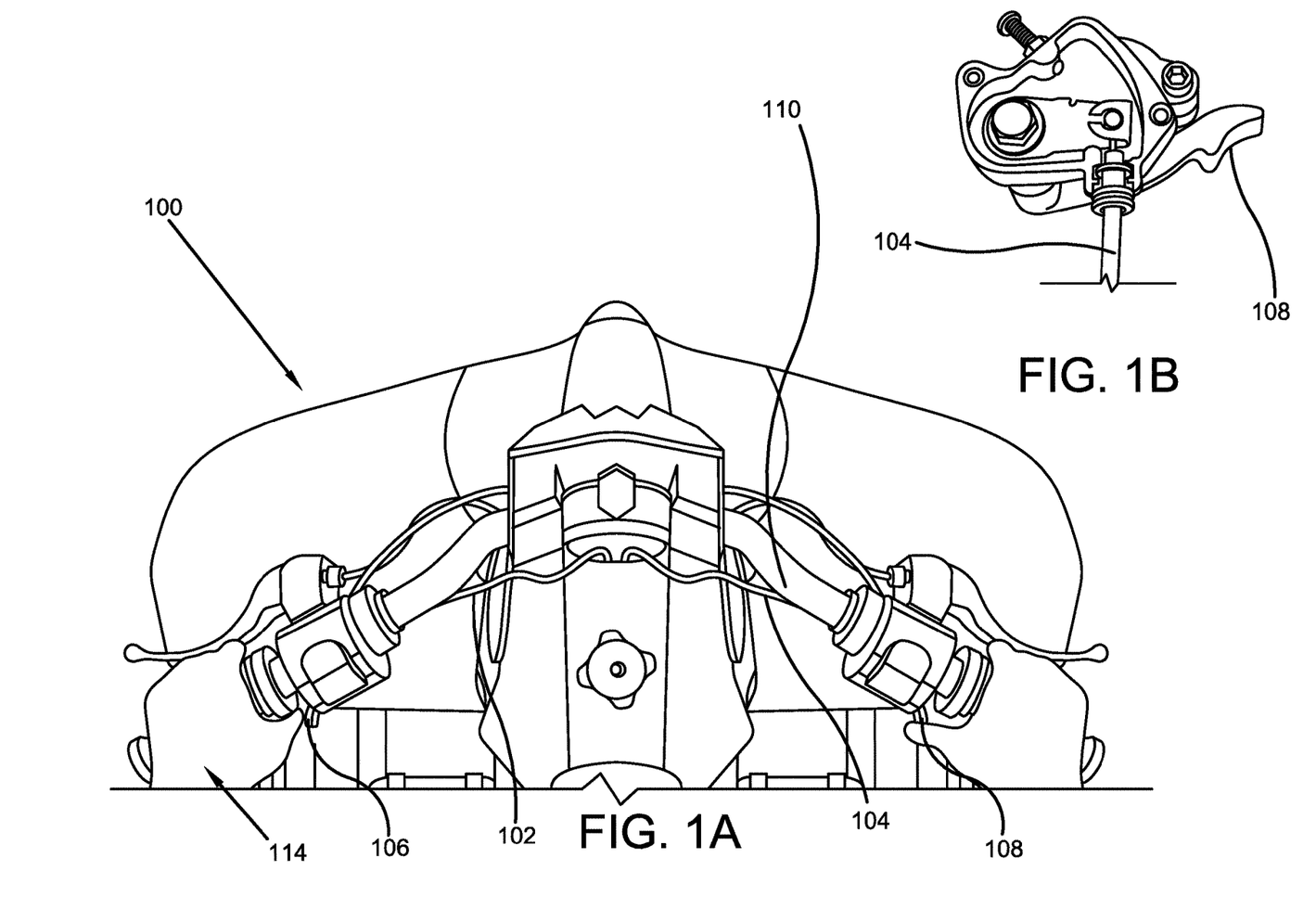
FIG. 1A illustrates a top view of an ATV equipped with a dual throttle control system of the present invention in accordance with the disclosed architecture.
FIG. 1B illustrates a perspective view of the right throttle cable and right throttle thumb control of the present invention in accordance with the disclosed architecture.

Referring initially to the drawings, FIG. 1 illustrates a top view of an ATV equipped with dual throttle control system of the present invention in accordance with the disclosed architecture. The dual throttle control system 100 of the present invention includes independent left throttle cable 102 and right throttle cable 104. The left throttle cable 102 is coupled to a left thumb throttle control 106 and the right throttle cable 104 is coupled to a right thumb throttle control 108 and the thumb throttle controls 106, 108 function as throttle levers for selectively and independently operating the respective throttle cables 102, 104.

The thumb throttle controls 106, 108 are preferably positioned on the handlebar 110 enabling a rider of the vehicle to easily control and actuate the throttle cables 102, 104. The thumb throttle control 106, 108 better enables the ATV 114 rider to shift bodyweight for optimal vehicle maneuverability while still maintaining precise throttle control.

The left throttle cable 102 connects the thumb throttle control 106 to a carburetor throttle 112 (shown in FIG. 2) of internal combustion engine of the ATV 114. Similarly, the right throttle cable 104 connects the thumb throttle control 108 to the carburetor throttle 112 of internal combustion engine of the ATV. The detailed description of the carburetor throttle 112 is described in FIG. 2.

During use of the ATV, one of the left and right throttle systems is used for providing acceleration to the ATV as per preferences of a rider. For example, when the right throttle cable 104 is actuated using the right thumb control 108, then, the left throttle cable 102 is not used and in case of a malfunction, break down, and/or crash damage in the active right throttle cable 104, the left throttle cable 102 is actuated for providing acceleration and therefore, eliminates the ATV from breaking down and prevents rescue situations from taking additional time due to malfunctioning rescue and safety vehicles. It is to be appreciated that when the right throttle control 108 is operational, the left throttle control 106 can be prohibited (i.e. disengaged) from operation, and vice versa. Thus, the throttle control can be selected and limited to one of the controls 106, 108 as desired by the user.

Figure 2:
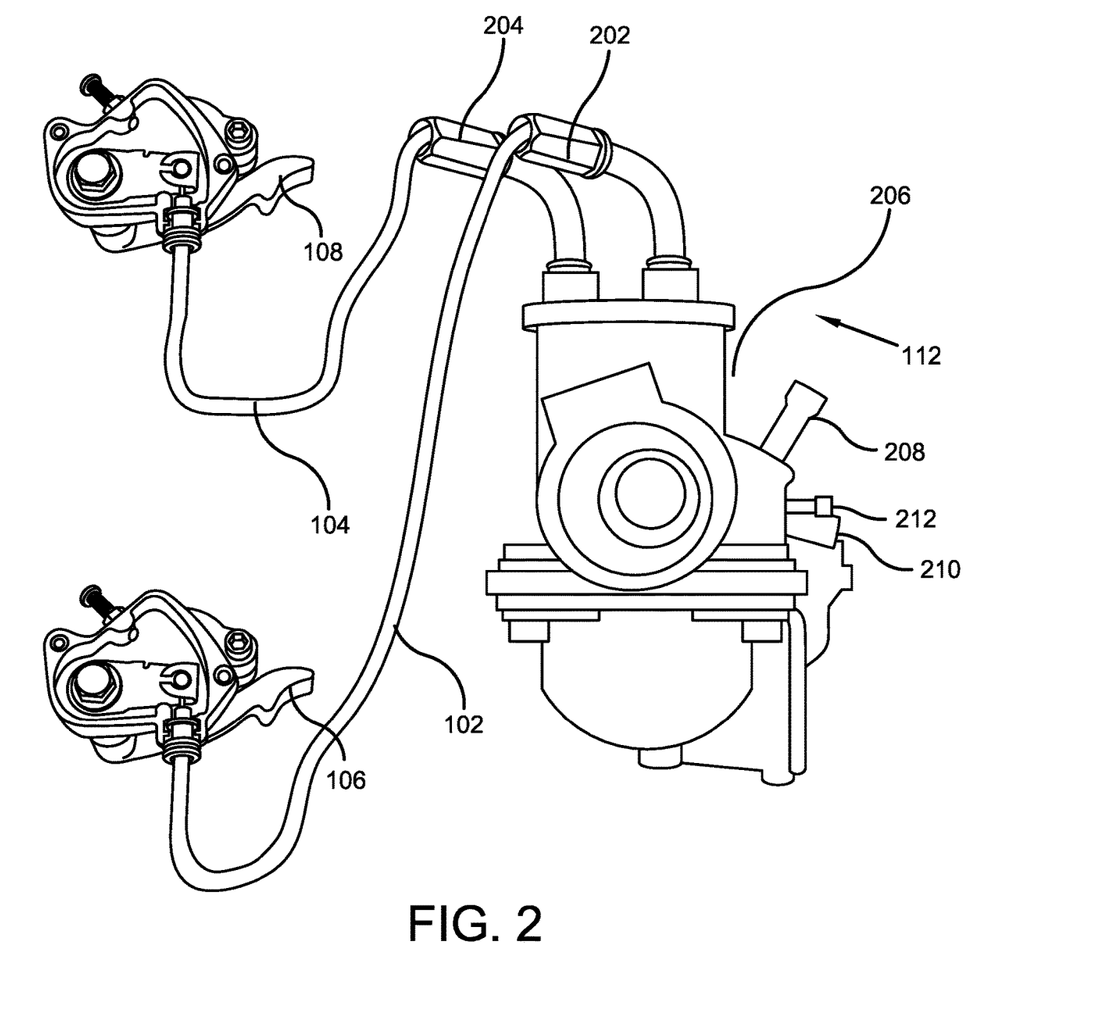
FIG. 2 illustrates a perspective view of connection of the throttle cables with the throttle carburetor of the present invention designed to deploy in rescue vehicles in accordance with the disclosed architecture.

FIG. 2 illustrates a perspective view of connection of the throttle cables with the throttle carburetor of the present invention designed to deploy in rescue vehicles in accordance with the disclosed architecture. The carburetor 112 of the combustion engine of a vehicle in which the dual throttle system is installed is a modified carburetor to accommodate two independent throttle cables 102, 104. The carburetor 112 helps in mixing fuel and air together for facilitating internal combustion inside an internal combustion engine and can be independently actuated by any of the two throttle cables 102, 104.

The left throttle cable 102 is inserted into a first throttle cable shaft 202 and the right throttle cable 104 is inserted into a second throttle cable shaft 204. The cables 102, 104 connect the thumb throttle controls 106, 108 respectively to the shafts 202, 204. It should be noted that a corresponding choke cable slot for each throttle cable slot may also be present in the carburetor 112 for restricting the flow of air in the carburetor of the engine. The shafts 202, 204 are integrally connected to a mixing chamber 206 used for mixing air and fuel together.

The carburetor 112 further has essential components like a fuel line connection 208, oil injector connection 210, throttle stop screw 212 and more for functioning of the carburetor 112.

It should be noted that the dual throttle system design is for vehicles whose steering unit does not rotate 360 degrees. Another embodiment of the system is designed for vehicles with steering unit capable of rotating 360 degrees.

Figure 3A:
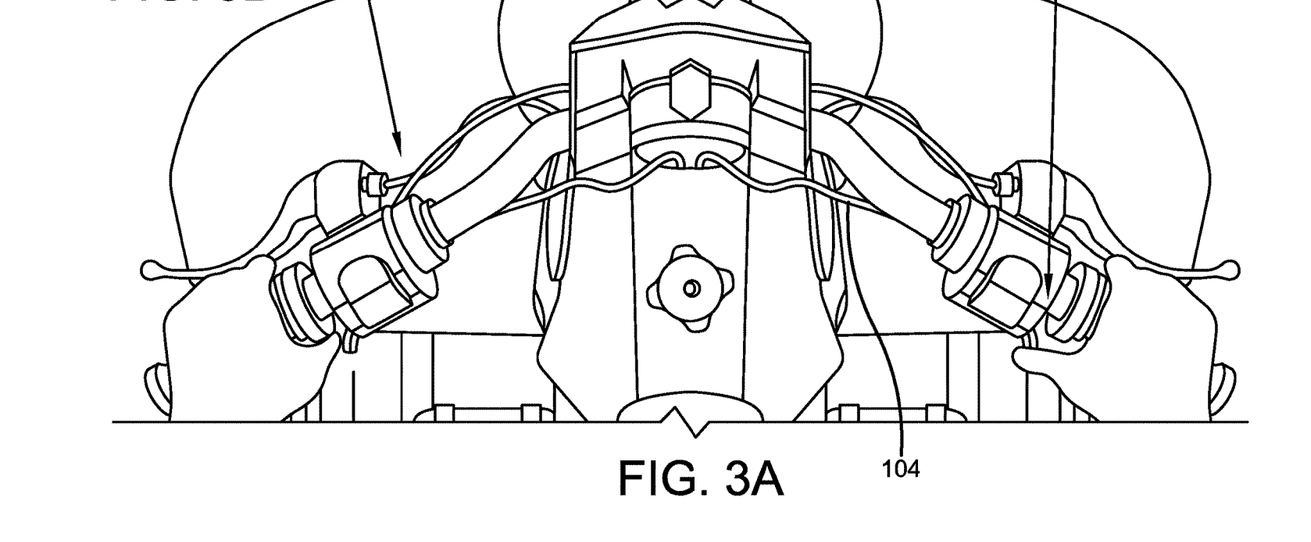
FIG. 3A illustrates a perspective view of the dual throttle control system of the present invention in accordance with the disclosed architecture.
Figure 3B:
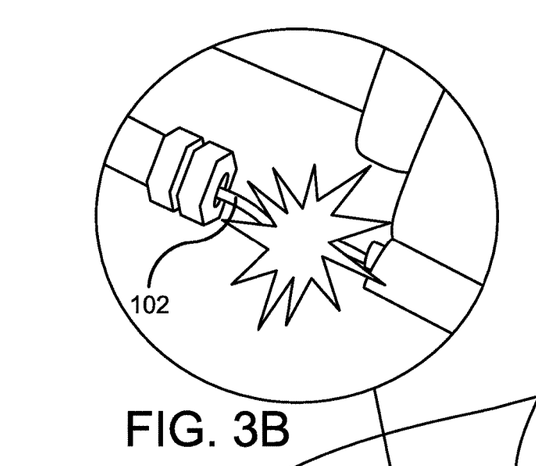
FIG. 3B illustrates a perspective view showing break down of a first throttle cable of the dual throttle cable system of the present invention in accordance with the disclosed architecture.
Figure 3C:
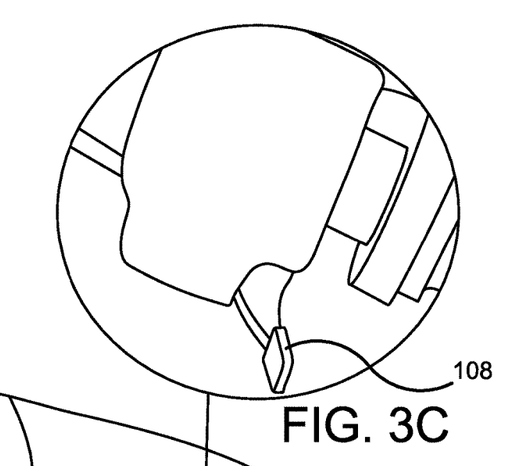
FIG. 3C illustrates a perspective view showing activation of a second throttle cable upon break down of the first throttle cable of the dual throttle cable system of the present invention in accordance with the disclosed architecture.

FIG. 3 illustrates a perspective view showing activation of a second throttle cable upon break down of a first throttle cable of the dual throttle cable system of the present invention in accordance with the disclosed architecture. When one of the throttle cables, throttle cable 102, for example snaps or becomes damaged, the throttle system 100 enables the use of second throttle cable 104 for providing acceleration to the vehicle, thereby eliminating breakdown time and possible stranding. More specifically, when the left throttle cable 102 breaks, snaps, wears down, or comes out of adjustment, the drivability of the vehicle is not affected unlike with conventional single throttle cable systems, as a rider of the vehicle can actuate the right throttle cable 104 using the thumb controller 108.

The thumb controller 108 when actuated, enables the throttle cable 104 to actuate and facilitate acceleration. The rider is able to actuate the throttle without removing thumb or the palm of hand from contact with the handlebar. Similarly, when the right throttle cable 104 breaks down, the left throttle cable 102 can become functional using the corresponding thumb control positioned on the handlebar.

Figures 4A, 4B, 4C:
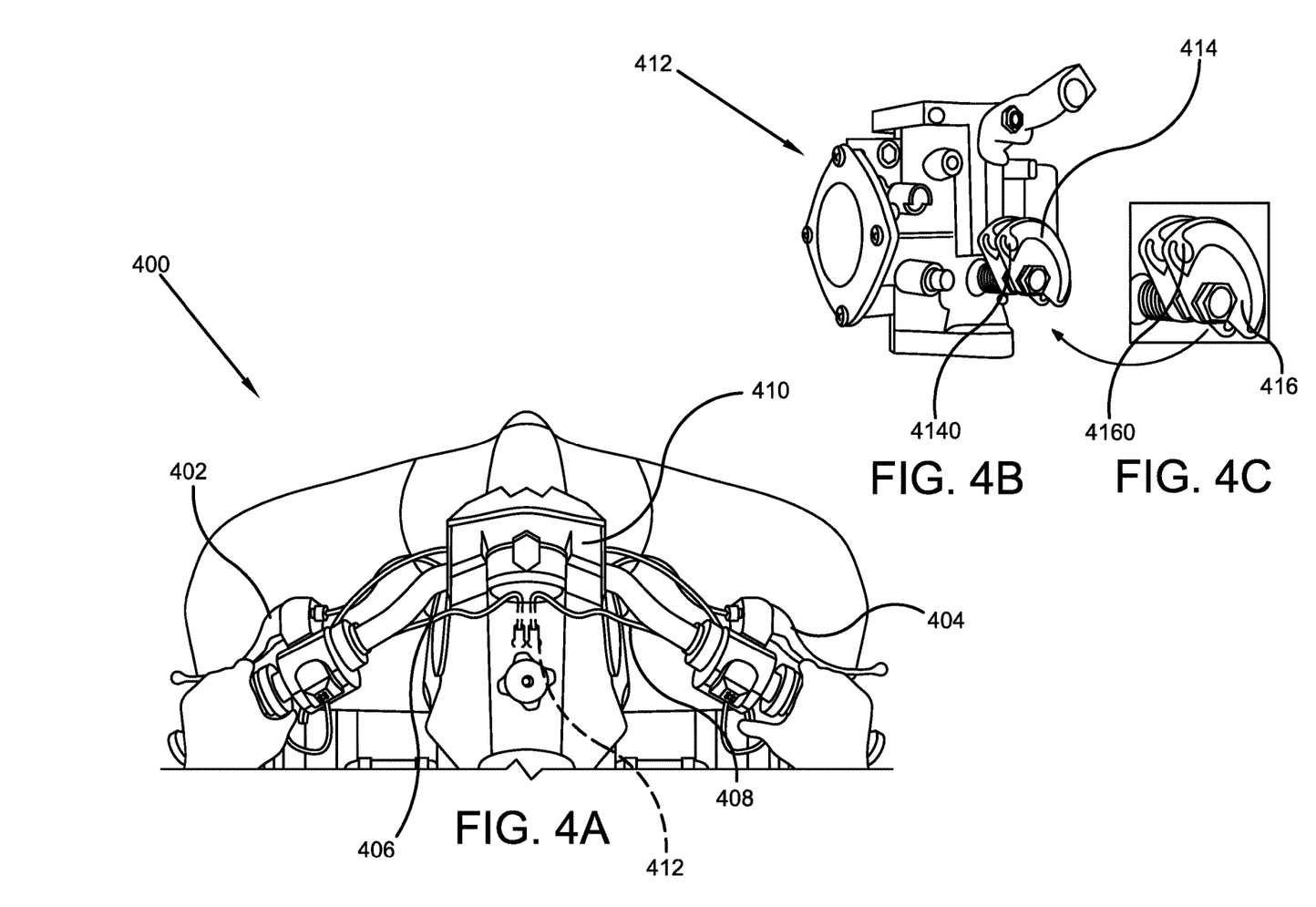
FIG. 4A illustrates a jet ski equipped with the dual throttle system of the present invention in accordance with the disclosed architecture.
FIG. 4B illustrates another embodiment of the dual throttle system of the present invention used in a jet ski for providing acceleration in accordance with the disclosed architecture.
FIG. 4C illustrates a perspective view of the cable connector and connector slots of the dual throttle system of the present invention used in a jet ski for providing acceleration in accordance with the disclosed architecture.

FIG. 4A illustrates a jet ski equipped with dual throttle system of the present invention in accordance with the disclosed architecture. As illustrated, the independent throttle control bars 402, 404 are positioned on the handlebar 406 of the jet ski 400 enabling independent control and activation of the throttle cables 406, 408. The first throttle cable 406 is coupled to the throttle control bar 402 and the second throttle cable 408 is coupled to the control bar 404 for independent operation and facilitation of acceleration of the jet ski 400.

The throttle system (including carburetor 412) is positioned inside the central housing 410 of the handlebar 406 and is coupled to the throttle cables 406, 408. As illustrated, in FIG. 4A, the left throttle control bar 402 is used by a rider for accelerating the jet ski 400 using the left throttle cable 406. The right throttle cable 408 can be used in a similar manner using the throttle control bar 404. In the present embodiment, the throttle cables 406, 408 are housed inside housing of the jet ski 400, unlike the open throttle cables shown in ATV of FIG. 1.

FIG. 4B illustrates another embodiment of the dual throttle system of the present invention used in a jet ski for providing acceleration in accordance with the disclosed architecture. The carburetor in the present embodiment is a half-moon dual carburetor 412 that has separate throttle cable connectors 414, 416. The first connector 414 is coupled to the first throttle cable 406 using a first connector slot 4140 and the second connector 416 is coupled to the second throttle cable 408 using a second connector slot 4160 enabling separate connections with the fuel and air mixing chamber 418.

It should be appreciated that the dual throttle control system can be designed to accommodate various carburetor designs and various throttle cables. Throttle cables of both push and pull types can be accommodated in the dual throttle system of the present invention and therefore, the system can be used for accelerating any type of rescue vehicle without any delay.

Figure 5:
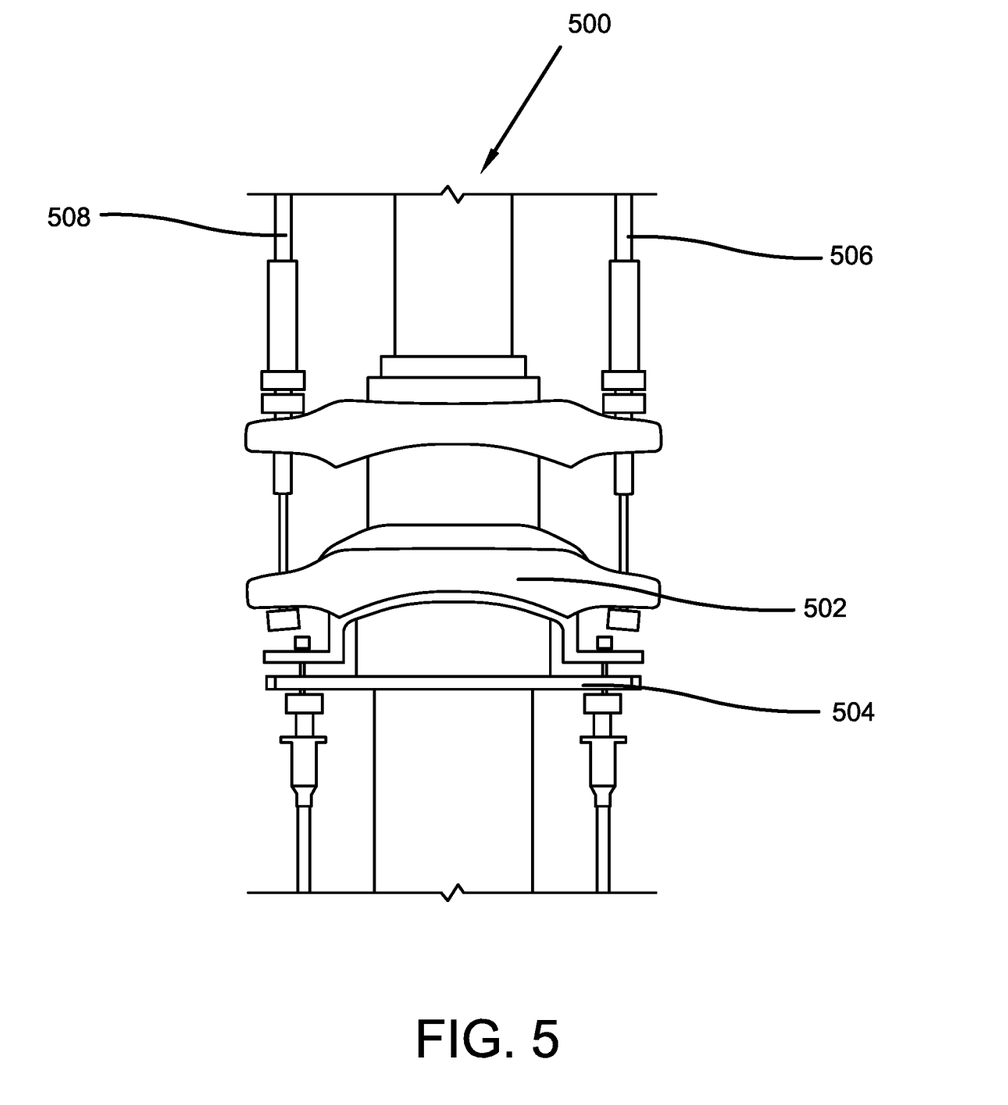
FIG. 5 illustrates a yoke and plate system used in the dual control throttle system for vehicle that have steering unit capable of rotating 360 degrees in accordance with the disclosed architecture.

FIG. 5 illustrates a perspective view of a yoke and plate system used in the dual control throttle system for vehicles that have steering unit capable of rotating 360 degrees in accordance with the disclosed architecture. The present embodiment of the system 500 has a central plate 502 and a yoke for individual throttle cable for enabling connection to a carburetor of an engine. The first throttle cable 506 is attached to the yoke 504 and the central plate 502 enabling independent movement and use of the cable 506 for actuating a vehicle. Similarly, the second throttle cable 508 is attached to yoke 504 and the central plate 502 enabling independent movement and use of the cable 508 for actuating the vehicle.

The system 500 is designed to use with vehicles that have steering unit capable of rotating 360 degrees and thus the yoke and the plate are helpful in working of the throttle system.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "dual control throttle system," "throttle system," "improved throttling system," and "dual control throttle cable system" are interchangeable and refer to the dual control throttle system 100, 500 of the present invention for rescue vehicles.

Notwithstanding the forgoing, the dual control throttle system 100, 500 of the present invention can be of any suitable size and configuration as is known in the art without affecting the overall concept of the invention, provided that it accomplishes the above stated objectives. One of ordinary skill in the art will appreciate that the dual control throttle system 100, 500 as shown in the FIGS. are for illustrative purposes only, and that many other sizes and shapes of the dual control throttle system 100, 500 are well within the scope of the present disclosure. Although the dimensions of the dual control throttle system 100, 500 are important design parameters for user convenience, the dual control throttle system 100, 500 be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A dual throttle control system for a motorized vehicle, the dual throttle control system comprising:
   a right throttle cable coupled to a right throttle control;
   a left throttle cable coupled to a left throttle control, wherein said right throttle control and said left throttle control function as throttle levers for selectively and independently operating the respective said right throttle cable and said left throttle cable;
   a handlebar for mounting said right throttle control and said left throttle control on opposing ends of said handlebar; and
   a carburetor including a right throttle cable shaft and a left throttle cable shaft for receiving respectively said right throttle cable and said left throttle cable, wherein said right throttle control and said left throttle control independently control said carburetor, and further wherein said carburetor is a half-moon dual carburetor including a right cable connector for receiving said right throttle cable and a left cable connector for receiving said left throttle cable.

2. The dual throttle control system of claim 1, wherein said right cable connector is coupled to said right throttle cable with a first connector slot and the left cable connector is coupled to said left throttle cable with a second connector slot enabling separate connections with said carburetor.

3. The dual throttle control system of claim 2, wherein selective operating of said right throttle control and said left throttle control is limited to one throttle control at a time.

4. The dual throttle control system of claim 2, wherein said right throttle control and said left throttle control are thumb levers.

5. The dual throttle control system of claim 2, wherein said motorized vehicle is selected from a group consisting of an ATV, a jet ski and a snowmobile.

6. A dual throttle control system for a motorized vehicle, the dual throttle control system comprising:
   a right throttle cable;

a left throttle cable;

a central plate;

a yoke, wherein said right throttle cable is attached to said yoke and said central plate and further wherein said left throttle cable attached to said yoke and said central plate;

a carburetor including a right throttle cable shaft and a left throttle cable shaft for receiving respectively said right throttle cable and said left throttle cable;

a right throttle control and a left throttle control, wherein said right throttle cable is coupled to said right throttle control and said left throttle cable is coupled to said left throttle control for independently controlling said carburetor; and a handle for mounting said right throttle control and said left throttle control on opposing ends of said handle;

wherein said central plate and said yoke rotate 360 degrees;

wherein said right throttle control and said left throttle control function as throttle levers for selectively and independently operating the respective said right throttle cable and said left throttle cable;

wherein said right throttle control and said left throttle control independently control said carburetor; and further wherein said carburetor is a half-moon dual carburetor including a right cable connector for receiving said right throttle cable and a left cable connector for receiving said left throttle cable.

7. The dual throttle control system of claim 6, wherein said right cable connector is coupled to said right throttle cable with a first connector slot and the left cable connector is coupled to said left throttle cable with a second connector slot enabling separate connections with said carburetor.

8. The dual throttle control system of claim 6, wherein selective operating of said right throttle control and said left throttle control is limited to one throttle control at a time.

9. The dual throttle control system of claim 6, wherein said right throttle control and said left throttle control are thumb levers.

* * * * *